United States Patent
Zupon et al.

(10) Patent No.: US 8,309,200 B2
(45) Date of Patent: *Nov. 13, 2012

(54) REFLECTIVE INSULATION

(75) Inventors: Lawrence Zupon, Bentleyville, OH (US); David Dejarlais, Marshfield, WI (US); James Gambatese, Solon, OH (US); Stephen Neff, Hudson, OH (US)

(73) Assignee: Guardian Building Products Distribution, Inc., Greer, SC (US)

( * ) Notice: Subject to any disclaimer, the term of this patent is extended or adjusted under 35 U.S.C. 154(b) by 825 days.

This patent is subject to a terminal disclaimer.

(21) Appl. No.: 11/827,633

(22) Filed: Jul. 12, 2007

(65) Prior Publication Data

US 2007/0259155 A1 Nov. 8, 2007

Related U.S. Application Data

(63) Continuation-in-part of application No. 10/947,756, filed on Sep. 23, 2004, now abandoned, which is a continuation of application No. 10/083,205, filed on Feb. 26, 2002, now Pat. No. 6,797,356.

(60) Provisional application No. 60/271,794, filed on Feb. 27, 2001.

(51) Int. Cl.
| | |
|---|---|
| B32B 3/04 | (2006.01) |
| B32B 3/10 | (2006.01) |
| B32B 27/04 | (2006.01) |
| B32B 27/12 | (2006.01) |
| B32B 15/14 | (2006.01) |
| B32B 27/32 | (2006.01) |
| B32B 29/02 | (2006.01) |
| D04H 1/00 | (2006.01) |
| D04H 3/00 | (2012.01) |
| D04H 5/00 | (2012.01) |
| D04H 13/00 | (2006.01) |

(52) U.S. Cl. ........ 428/121; 428/131; 428/137; 428/138; 442/149; 442/150; 442/376; 442/378; 442/394; 442/398; 442/412

(58) Field of Classification Search .................. 428/121, 428/131, 137, 138; 442/149, 150, 376, 378, 442/394, 398, 412

See application file for complete search history.

(56) References Cited

U.S. PATENT DOCUMENTS 3,097,124 A 7/1963 Denenberg
(Continued)

OTHER PUBLICATIONS

Product brochure submitted in its entirety of Polyair Insulation (date unknown).

(Continued)

Primary Examiner — Elizabeth Cole
Assistant Examiner — Jeremy R Pierce
(74) Attorney, Agent, or Firm — Dority & Manning, P.A.

(57) ABSTRACT

A reflective insulation system. The reflective insulation system includes a reflective layer such as aluminum, a layer of fiberglass, and a layer of vapor retarding material. A first side of the layer of fiberglass is bonded to the reflective layer by a deposit of hot melt glue. The second side of the layer of fiberglass is bonded to the layer of vapor retarding material by a second deposit of hot melt glue. The vapor retarding layer may be a plastic material, such as polypropylene or a reflective material, such as aluminum. In an alternate construction, the reflective layer has a transverse dimension that is narrower than the vapor retarding material such that edge portions of the reflective layer are spaced inwardly with respect to edges of said vapor retarder material. A strip of adhesive tape, preferably foil tape, overlies and secures edge portions of the reflective and vapor retarder layers.

19 Claims, 6 Drawing Sheets

U.S. PATENT DOCUMENTS

| | | |
|---|---|---|
| 3,499,819 A | 3/1970 | Lewis |
| 3,734,814 A | 5/1973 | Davis, Sr. et al. |
| 4,073,998 A | 2/1978 | O'Connor |
| 4,121,958 A | 10/1978 | Koonts |
| 4,271,218 A | 6/1981 | Heckel et al. |
| 4,310,587 A | 1/1982 | Beaupre |
| 4,326,909 A | 4/1982 | Slavik |
| 4,444,821 A | 4/1984 | Young et al. |
| 4,736,552 A | 4/1988 | Ward et al. |
| 5,100,725 A | 3/1992 | Pearson |
| 5,169,700 A | 12/1992 | Meier et al. |
| 5,246,520 A | 9/1993 | Scanlon et al. |
| 5,316,835 A | 5/1994 | Groft et al. |
| 5,545,279 A | 8/1996 | Hall et al. |
| 5,554,246 A | 9/1996 | Anwyll et al. |
| 5,735,984 A | 4/1998 | Hoff et al. |
| 5,918,436 A | 7/1999 | Alderman |
| 6,006,481 A | 12/1999 | Jacobs |
| 6,083,603 A | 7/2000 | Patel et al. |

OTHER PUBLICATIONS 1 page specification sheet of Fi-Foil Company (Nov. 15, 200).
Reflective Insulation, Radiant Barriers and Radiant Control Coatings manual, Reflective Insulation Manufacturers Association (1999).
1 page Reflectix safety tip brochure (1999).
1 page Ply-Foil brochure, date unknown.
1 page Ayrf-Foil brochure (2000).
1 page Astro-Foil brochure, date unknown.

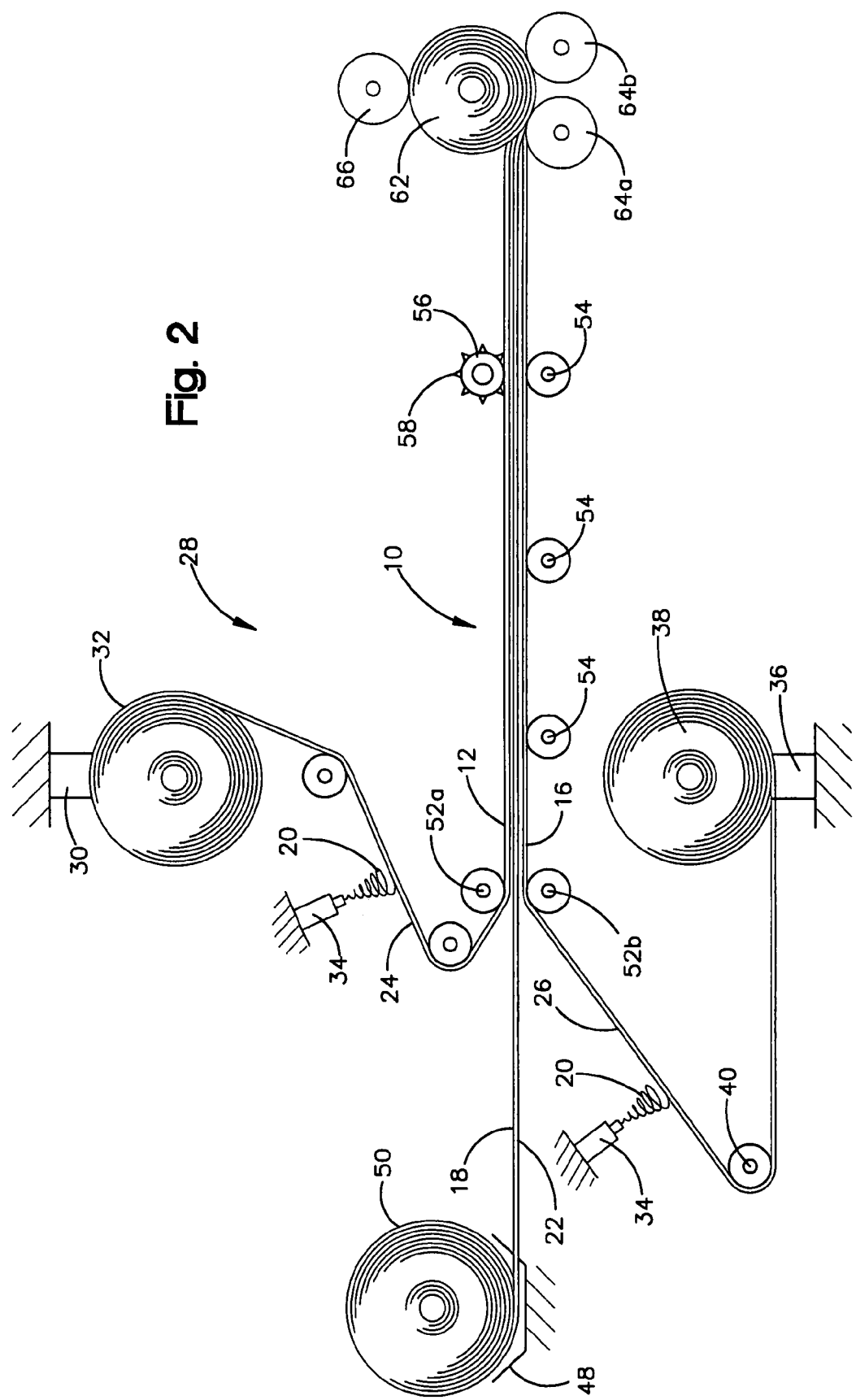

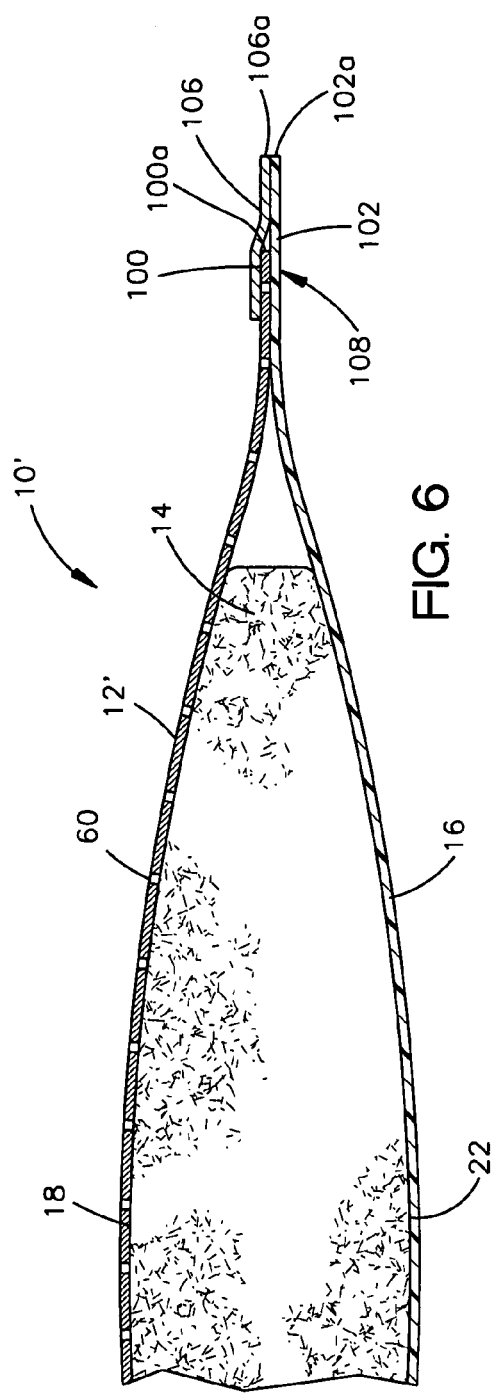
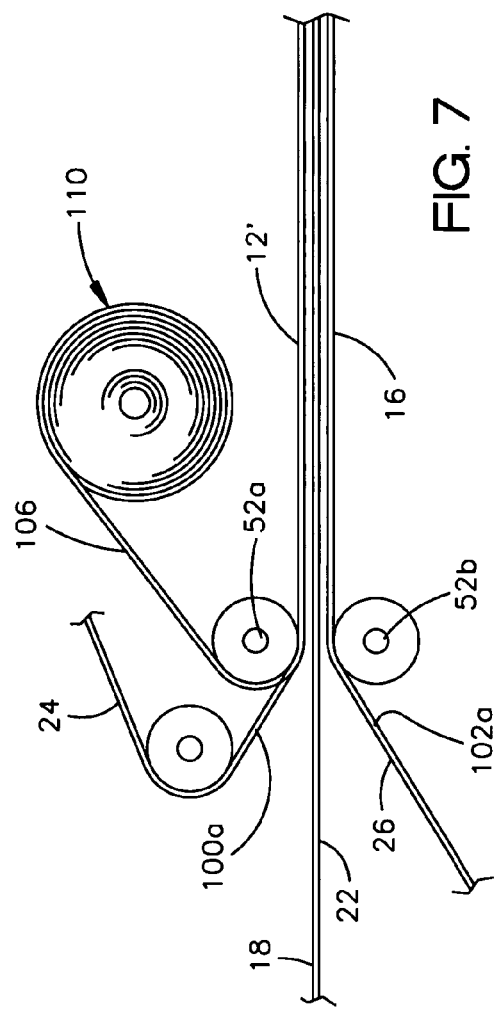
FIG. 6
FIG. 7

REFLECTIVE INSULATION

RELATED APPLICATIONS

The present application is a continuation-in-part application of U.S. application Ser. No. 10/947,756, filed Sep. 23, 2004, now abandoned, which is a continuation of U.S. application Ser. No. 10/083,205, filed Feb. 26, 2002 entitled REFLECTIVE INSULATION, now U.S. Pat. No. 6,797,356, which is a non-provisional application of provisional application Ser. No. 60/271,794, filed Feb. 27, 2001.

TECHNICAL FIELD

The present invention relates to reflective insulation and, in particular, reflective insulation that includes a layer of fiberglass insulation bonded to a layer of reflective material and a layer of vapor retarder material.

BACKGROUND ART

Radiation is the transfer of heat or energy from a hot surface to a cold surface through air or a vacuum. For example, radiant heat from the sun travels through space and strikes the roof of a building and exterior walls of a building, causing the roof and exterior walls of the building to increase in temperature. Heat flows from the outer surface of the roof and exterior walls of the building to inner surfaces of the roof and the walls of the building through conduction. If the inner surfaces of the roof and walls of the building are warmer than surfaces inside the building that are spaced apart from the roof and inner walls of the building, heat will radiate from the inner surfaces of the roof and the walls of the building to the surfaces inside the building. Radiation between surfaces inside a building occurs through invisible infrared heat rays.

Heat can also exit a building through radiation. In winter months, surfaces inside a building are often warmer than the inner surfaces of the walls and the roof of the building. Warmer surfaces inside the building radiate heat to the inner surfaces of the walls and the roof of the building, causing them to increase in temperature. This heat flows from the inner surfaces of the walls and the roof of the building to the outer surface of the walls and roof of the building through conduction.

The ability of a material to emit radiant energy and absorb radiant energy are defined by the materials emissivity and reflectivity. The lower the emissivity of a material, the lower the amount of heat that is radiated from its surface. The higher the reflectivity of the material, the higher the percentage of incident radiant heat that is reflected from the material's surface. Radiant barriers and reflective insulation systems reduce radiant heat transfer between surfaces across open spaces, which is a significant contributor to heat gain during warm months and heat loss during cold months. Radiant barriers are a single layer of reflective material spaced apart from a surface which radiates heat. Radiant barriers do not prevent heat on one side of the reflected material from being conducted to the second side of the reflective material. Reflective insulation systems are typically laminate products that reduce heat transferred due to radiation, as well as convection. Reflective insulation systems typically include a reflective layer and a conduction preventing layer. The conduction preventing layer prevents heat on the reflective layer of the reflective insulation system from being conducted to the second side of the reflective insulation system.

Reflective insulation systems are installed such that a reflective layer is spaced apart from the roof decking or the outer wall of a building. Heat that is radiated inward from the roof or outer walls of the building is reflected off the reflective layer of the reflective insulation system back to the roof or outer surface of the building. The temperature of the roof or outer surface of the building increases rather than the interior of the building.

In winter applications, heat radiated by surfaces in the interior of the building are reflected back into the interior of the building if a reflective layer is included that faces the interior of the building. By reflecting radiant heat from the roof and external walls of the building back to the roof and outer walls of the building the heat that enters the building is reduced during warm months. By reflecting the heat radiated by the interior surfaces of the building back to the interior surfaces of the building, the heat that escapes from the building is reduced during cold months.

Several reflective insulation systems currently exist. One reflective insulation system includes two layers of aluminum separated by one or more layers of plastic bubbles or plastic foam material. An example of a reflective insulation system having a central layer formed of a plastic foam material and two outer aluminum foil layers is described in U.S. Pat. No. 5,316,835 to Groft et al. The layers of this reflective insulation system are heat or flame laminated together into a single insulative construction. Another existing reflective insulation system includes a layer of aluminum foil bonded to a layer of plastic bubbles or foam material and a layer of polyethylene vapor barrier bonded to the layer of plastic bubbles or plastic foam material. One significant problem with existing reflective insulation systems is that the layer of plastic bubbles or plastic foam is highly flammable. The flammability of the layer of plastic bubbles or foam greatly limits the number of applications this type of reflective insulation system can be used in.

Typically, reflective insulation systems which use plastic bubbles or foam material as the center layer bond the layer of plastic bubbles or foam material to the two layers of aluminum foil or layer of aluminum foil and layer of polyethylene by heating the materials to fuse them together. This process restricts the types of vapor barriers that can be used in these reflective insulation systems. Most notably, polyethylene or polypropylene vapor barriers that are least flammable cannot currently be used in these reflective insulation systems, since they do not readily bond by heating and fusing. The vapor barriers that can be bonded by heating and fusing are more flammable, adding to the flammability problem.

Water-based adhesives have been used to laminate insulation products in the past. Water based adhesives must dry out to properly cure and create a strong bond between the facing and the insulation. Water-based adhesives work well for laminating insulation that has facing on only one side and when a thick layer of insulation is used, because the adhesive is able to thoroughly dry.

Water-based adhesives would not work well for laminating a thin layer of insulation between two layers of facing, since the air movement around the adhesive is very restricted. The restricted air movement around the adhesive would greatly increase the time required for the water-based adhesive to cure and may even prevent the adhesive from ever properly curing.

If a water-based adhesive freezes before it properly dries, the water-based adhesive will never properly cure and will not provide a sufficient bond between the materials being glued together. This is especially problematic in cold weather climates. Insulation products are often loaded onto trucks that are exposed to the cold weather a short time after a layer of facing is laminated to the insulation, potentially allowing the adhesive to freeze before a it can properly cure.

There is a need for a reflective insulation system that comprises a layer of fiberglass insulation bonded between a reflective layer and a vapor retarder layer by a hot melt glue or other adhesive that is able to properly cure when airflow is restricted. Such a reflective insulation system is significantly less flammable than existing reflective insulation systems.

DISCLOSURE OF INVENTION

The present invention concerns a less flammable reflective insulation system. The reflective insulation system includes a layer of reflective material such as aluminum, a layer of fiberglass insulation, and a layer of vapor retarder material. The layer of fiberglass is bonded to one side of the reflective layer by hot melt glue. The layer of vapor retarder material is bonded to the second side of the layer of fiberglass insulation by hot melt glue.

One embodiment of the reflective insulation system includes a layer of perforated aluminum foil. A layer of fiberglass is bonded to the perforated aluminum foil by hot melt glue. A vapor barrier laminate including a layer of polypropylene, a layer of scrim material, and a layer of kraft material is bonded to the second side of the layer of fiberglass by hot melt glue.

The reflective insulation system is made by unrolling a length of aluminum sheet from a roll of aluminum sheet. Hot melt glue is applied to one side of the aluminum sheet. A length of vapor barrier sheet is unrolled from a roll of vapor barrier material. Hot melt glue is applied to one side of the vapor barrier. A length of fiberglass insulation is unrolled between the aluminum sheet and the vapor barrier sheet from a roll of fiberglass insulation. The aluminum sheet and the vapor barrier sheet are pressed together to bond the aluminum sheet and the vapor barrier sheet to the fiberglass insulation. The aluminum sheet is perforated to allow air to escape from the reflective insulation system. The formed laminate is rolled onto a reflective insulation roll. Excess air trapped between the aluminum sheet and the vapor barrier is squeezed out of the perforations in the aluminum sheet as it is rolled on to the roll.

The reflective insulation system of the present invention has many advantages over prior art reflective insulation systems. The inner layer of the reflective insulation system of the present invention is fiberglass insulation, which is much less flammable than the foam and bubble-type material used in inner layers of prior art reflective insulation systems. Since the outer layers of the reflective insulation system are not fused to the center layer with heat, vapor barrier materials that perform better in flame and smoke tests can be used to construct the reflective insulation system. The hot melt glue allows fiberglass insulation to be bonded to less flammable vapor barriers. It is not necessary to dry the hot melt glue that is used to bond the layers together, eliminating the risk of delamination of the materials due to failure of the adhesive to properly dry and bond.

In an alternate construction, the reflective layer has a transverse dimension that is narrower than the transverse dimension of the vapor retarder layer. With this construction, edges of the reflective layer are spaced inwardly from the edges of the vapor barrier layer. A strip of tape, preferably a reflective foil tape is used to secure the edge of the reflective layer to the edge of the vapor barrier layer. In the illustrated embodiment, an outboard edge of the tape is aligned with an outboard edge of the vapor barrier layer and the opposite side of the taper overlies an edge portion of the reflective layer.

The alternate insulation system is preferably made by using a method similar to the method described above. The apparatus for making the alternate insulation system includes a supply of tape associated with each side of the reflective insulation system. Tape dispensers deliver tape that is applied to the edges of the system in order to secure edge portions of the reflective layer to edge portions of the vapor barrier layer.

Many additional features, advantages and a fuller understanding of the invention will be had from the accompanying drawings and detailed description that follows.

BRIEF DESCRIPTION OF DRAWINGS

FIG. 2 is a schematic representation of an apparatus for producing a reflective insulation system;

FIG. 6 is a fragmentary, sectional view of an alternate reflective installation system constructed in accordance with another preferred embodiment of the invention; and, FIG. 7 is a fragmentary, schematic representation of an apparatus for producing the alternate embodiment of the reflective installation system shown in FIG. 6.

BEST MODE FOR CARRYING OUT THE INVENTION

Figure 1A:
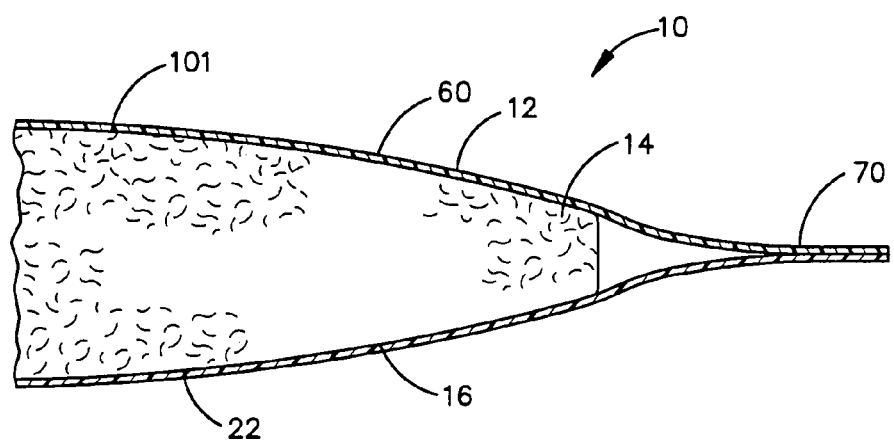
FIG. 1A is a perspective view of a reflective insulation system shown in cross-section.
Figure 1B:
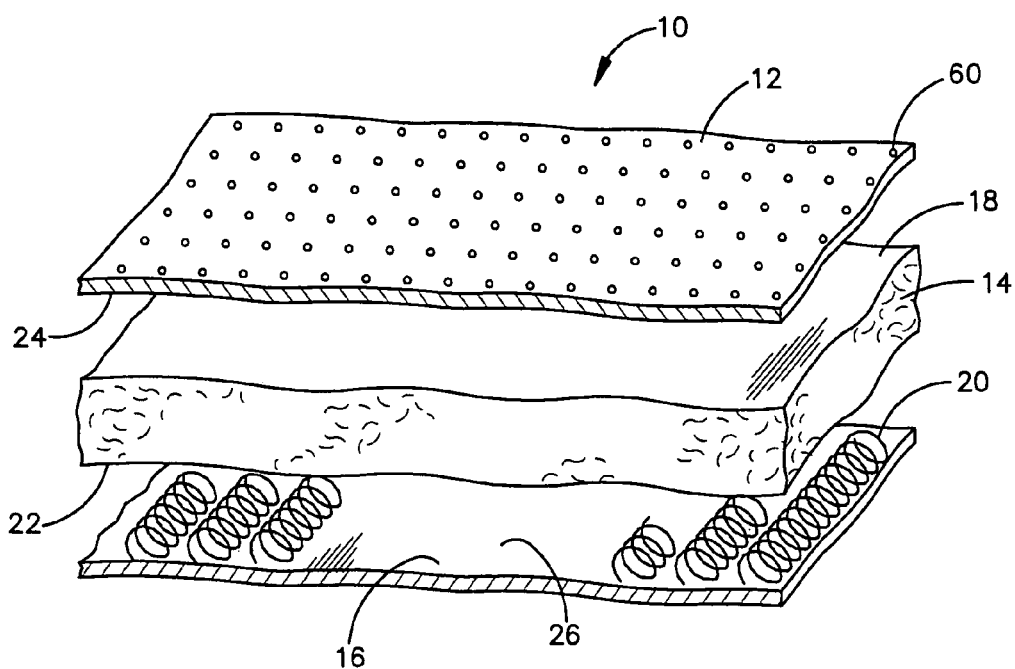
FIG. 1B is an exploded perspective view of a reflective insulation system shown in cross-section.

Referring to FIGS. 1A and 1B, the present invention is directed to a reflective insulation system 10. The reflective insulation system 10 includes a reflective layer 12, a layer of fiberglass 14, and a vapor barrier layer 16. A first side 18 of the layer of fiberglass 14 is bonded to the reflective layer 12 by a deposit of hot melt glue 20 (FIG. 2). The vapor barrier layer 16 is bonded to a second side 22 of the fiberglass layer 14 by a second deposit of hot melt glue 20.

The reflective layer 12 has an outer layer that is made from a reflective material such as aluminum. In the exemplary embodiment, the reflective layer 12 is a laminate that includes a layer of aluminum foil adhered to a polyester film by a flame resistant adhesive. In the exemplary embodiment, the aluminum foil of the reflective layer laminate is 0.0003 inches thick and the polyester film is 0.00048 inches thick. The polyester film strengthens the reflective layer 12, preventing it from being torn easily. Since the adhesive used to bond the reflective layer together is flame resistant and the polyester film is very thin, the reflective layer 12 is resistant to flame spread and smoke development when the material is burned, according to ASTM specification E84. One acceptable reflective layer 12 is Cleveland Laminating's 8910 foil/polyester facing. The UL 723 ratings for Cleveland Laminating's 8910 material are as follows:

|  | Flame Spread | Smoke Developed |
| --- | --- | --- |
| Foil Exposed | 5 | 0 |
| Polyester Exposed | 5 | 10 |

In the exemplary embodiment, the fiberglass layer 14 is a lightweight and highly resistant blanket-type thermal and acoustical insulation made of flame-attenuated glass fibers bonded with a thermosetting resin. In the exemplary embodiment, the layer of fiberglass 14 has a 1.25# density and is ¼" thick. It should be readily apparent to those skilled in the art that fiberglass insulation having a different density or a different thickness could be used. One acceptable fiberglass layer 14 may be purchased from Johns Manville on a custom made basis. In the exemplary embodiment, the layer of fiberglass 14 has a 25/50 fire hazard classification per ASTM E-84 and UL 723.

The vapor barrier layer 16 is made from a vapor retarding material. In one embodiment, the vapor barrier layer 16 includes an outer surface that is made from a reflective material, such as aluminum. One the vapor barrier layer 16 that may be used in this embodiment is a laminate that includes a layer of aluminum foil, a layer of scrim material, and a layer of kraft material. In the exemplary embodiment, the aluminum foil layer is 0.0003 inches thick, and is coated with an elastomeric polymer that is 0.0001 inches thick. The layer of scrim is tri-directional fiberglass that reinforces the vapor barrier 16. The kraft material is bonded to the scrim material and the foil by a flame resistant adhesive. One acceptable aluminum foil vapor barrier layer is Lamtec Corporation's R-3035 material. The ASTM E84 and UL 723 ratings for Lamtec's R-3035 material are as follows:

|  | Flame Spread | Smoke Developed |
| --- | --- | --- |
| Foil Exposed | 5 | 0 |
| Kraft Exposed | 25 |  |

In another embodiment, the vapor barrier layer includes an outer plastic surface such as polypropylene. One vapor barrier layer 16 that may be used in this embodiment includes a polypropylene layer, a scrim material layer, and a kraft material layer. In the exemplary embodiment, the polypropylene layer is bonded to the reinforcing scrim material layer and the kraft material layer by a flame resistant adhesive. In the exemplary embodiment, the polypropylene layer is a white film that is 0.0015 inches thick. The scrim layer is a tri-directional fiberglass and polyester. The kraft material is bonded to the scrim materials and the polypropylene layer by a flame resistant adhesive. One acceptable polypropylene vapor barrier layer is Lamtec Corporation's WMP-VR polypropylene/scrim/kraft facing material. The UL 723 ratings for Lamtec's WMP-VR material are as follows:

|  | Flame Spread | Smoke Developed |
| --- | --- | --- |
| Foil Exposed | 10 | 10 |
| Kraft Exposed | 15 | 5 |

Referring to FIGS. 1B, 2 and 3, the hot melt glue 20 is applied to the inner surfaces 24, 26 of the reflective layer 12 and vapor barrier layer 16 in an overlapping swirl-like pattern. In the exemplary embodiment, the hot melt glue is a flame resistant hot melt adhesive. Flame resistant hot melt adhesives are available from Heartland Adhesives and Western. One acceptable flame resistant hot melt adhesive is Heartland Adhesives Part No. H-448. A flame resistant adhesive that may be used is Heartland Adhesives part number HC-384.

Figure 3A:
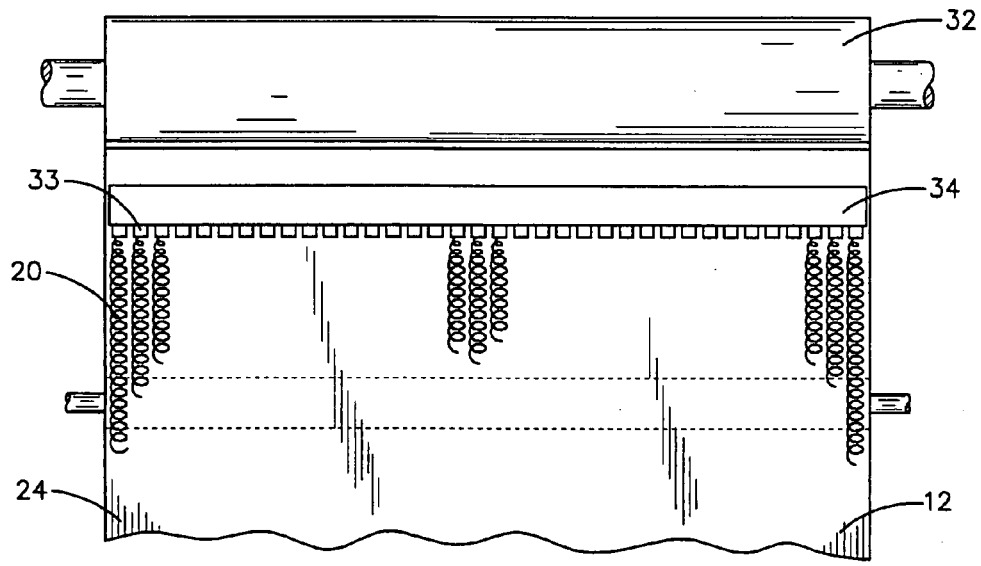
FIG. 3A is a front elevational view of a roll of reflective material used to construct a reflective insulation system and hot melt glue dispenser used to dispense glue onto the material.

An apparatus 28 for making the reflective insulation system 10 of the present invention is schematically depicted in FIG. 2 of the drawings. The apparatus 28 includes a reflective sheet roll support 30 that supports a roll 32 of reflective material 12. The apparatus 28 unrolls the reflective layer 12 from the reflective sheet roll support 30, past a set of glue dispensing nozzles 34. Referring to FIG. 3A, the set of hot melt glue dispensing nozzles 34 dispenses the hot melt glue 20 across the width of the reflective layer 12 as it moves beneath the row of hot melt glue dispensing nozzles 34. In the exemplary embodiment, the row of hot melt glue dispensing nozzles 34 apply the hot melt glue 20 to the inner surface 24 of the reflective layer 12 in an overlapping swirl-like pattern as is depicted in FIG. 3A. In the exemplary embodiment, the swirl-like pattern covers the entire inner surface 24.

Figure 3B:
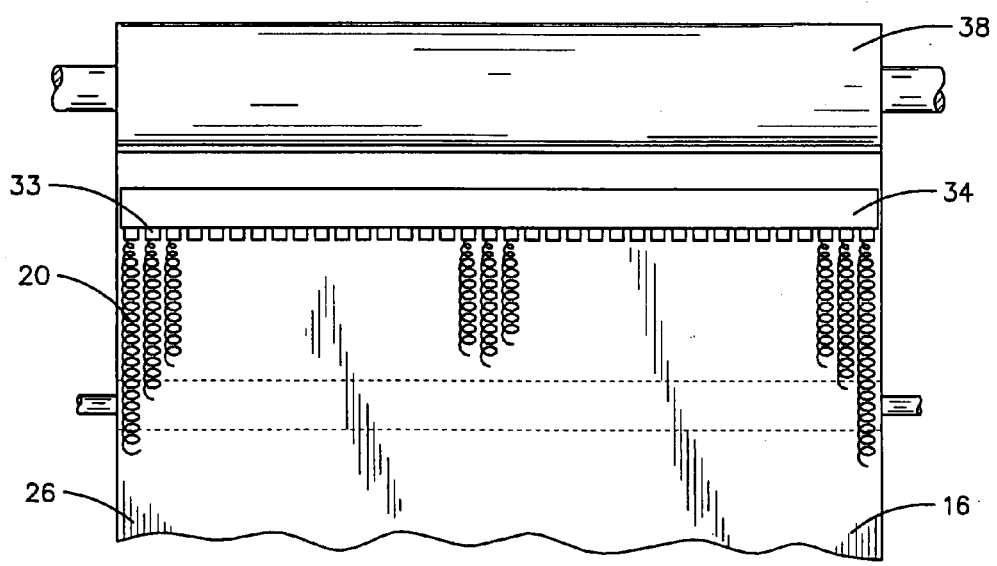
FIG. 3B is a front elevational view of a roll of vapor retarding material used to construct a reflective insulation system and hot melt glue dispenser used to dispense glue onto the material.
Figure 4:
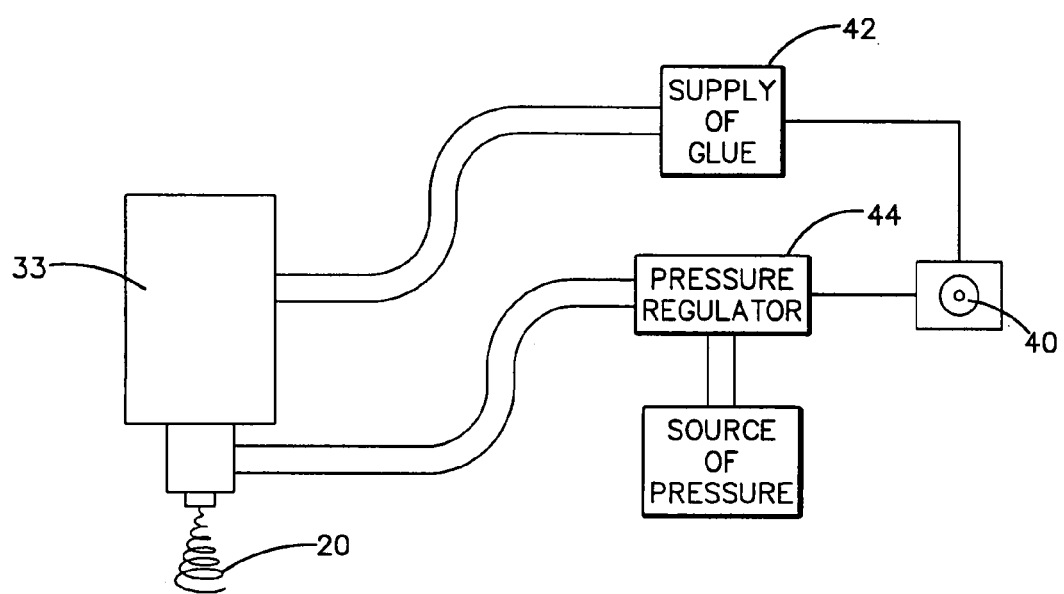
FIG. 4 is a schematic representation of a control system for controlling dispensing of hot melt glue.

The reflective insulation constructing apparatus 28 includes a vapor barrier roll support 36 that supports a roll of vapor barrier 38. The vapor barrier 16 is unrolled by the apparatus 28 around an encoder 40 that provides a signal that is indicative of whether the roll of vapor barrier is being unrolled. Referring to FIG. 4, when the encoder 40 is rotating, it supplies a signal to the supply of glue 42 and the pressure regulator 44 indicating that the roll of vapor barrier is being unrolled. When the supply of glue 42 receives the signal from the encoder that indicates that the roll of vapor barrier material is moving, the supply of glue supplies hot melt glue 20 to each dispensing nozzle 33, causing each dispensing nozzle 33 to deliver a liquid string of hot melt glue 20. When the pressure regulator 44 receives the signal from the encoder 40 that the roll of vapor barrier material is moving, the pressure regulator supplies air under pressure to each dispensing nozzle 33. The air under pressure supplied to each dispensing nozzle 33 causes the string of glue to be dispensed in a swirl-like pattern which is best shown in FIG. 3B. In the exemplary embodiment, the row of glue dispensing nozzles positioned over reflective layer 12 and the vapor barrier 16 both dispense hot melt glue when the encoder indicates that the vapor barrier material is being unrolled.

The vapor barrier layer 16 is further unrolled past a row of hot melt glue dispensing nozzles 34. The hot melt glue dispensing nozzles 34 apply the hot melt glue to the inner surface 26 of the vapor barrier layer 16, in a swirl-like pattern, as is depicted in FIG. 3B. In the exemplary embodiment, the swirl-like pattern covers the entire inner surface 26.

The reflective insulation system constructing apparatus 28 includes a fiberglass blanket roll support basket 48 that supports a roll of fiberglass insulation 50. The apparatus 28 causes the layer of fiberglass 14 to be unrolled from the fiberglass insulation roll 50 between the reflective layer 12 and the vapor barrier layer 16. The apparatus 28 includes first and second compressing rollers 52a, 52b that press the reflective layer 12 toward the layer of vapor barrier 16 to bring the hot melt glue 20 on the inner surfaces 24, 26 of the reflective layer and vapor barrier layer into contact with the layer of fiberglass. The hot melt glue 20 bonds the reflective layer 12 and the vapor barrier layer to the fiberglass insulation 14 to form the reflective insulation system 10.

The reflective insulation 10 is moved over supporting rollers 54 and under a perforating roller 56. The perforating roller 56 includes a plurality of spikes 58 along its axial length in the exemplary embodiment. As the reflective insulation system 10 moves past the perforating roller 56 the spikes 58 that extend from the perforating roller 56 perforate the reflective layer 12 to form perforations 60 (FIGS. 1A and 1B) in the reflective layer 12. One suitable pattern of perforations 60 in the reflective layer 12 is best shown in FIG. 1B. The perforations 60 allow air trapped between the reflective layer 12 and vapor barrier layer 16 to escape from the reflective insulation 10 as it is rolled onto a reflective insulation roll 62.

The apparatus 28 includes two support rollers 64a, 64b for supporting the reflective insulation system roll 62, and a compressing roll 66 that holds the roll of reflective insulation between the support rolls 64a, 64b. As the reflective insulation is rolled onto the roll 62, air that is trapped between the layer of aluminum foil 12 and the vapor barrier layer 16 is pressed out of the reflective insulation through the perforations, preventing a "bubble" from forming before the intersection of the support roller 64a and the roll of reflective insulation. Preventing a "bubble" from forming prevents the reflective layer and hot melt glue on the reflective layer from being pulled away from the insulation and allows the reflective insulation to be tightly rolled onto the roll 62.

In an alternate embodiment, the reflective layer 12 is not perforated. In this embodiment, the hot melt glue 20 is not applied to the reflective layer 12 or vapor barrier layer 16 where the edges 70 (one edge shown in FIG. 1A) of the reflective insulation system are formed. In this embodiment, any air trapped between the reflective layer 12 and the vapor barrier layer 16 can escape through the edges 70 of the reflective insulation system 10 that are not bonded together.

Figure 5:
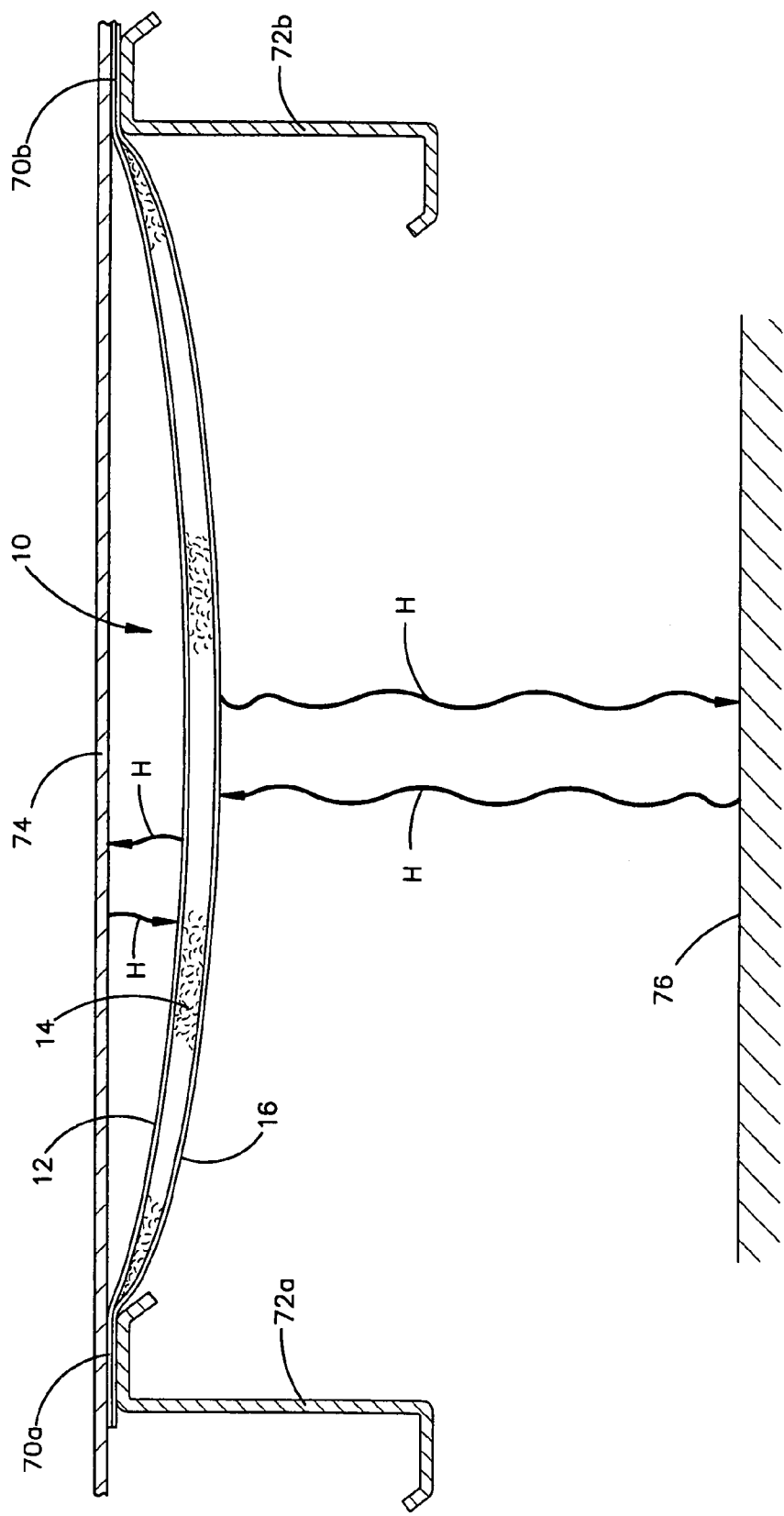
FIG. 5 is a sectional view of a reflective insulation system installed in a wall or roof of a building.

FIG. 5 illustrates the reflective insulation system 10 installed in a roof of a building. In one embodiment, the reflective insulation 10 is installed on the purlins by orienting the roll of reflective insulation perpendicular to the purlins and unrolling the reflective insulation across the purlins. The reflective insulation is allowed to sag between the purlins, such that there is a gap between the roof panels 74 and the reflective insulation 10. The reflective insulation is held in place by the roof panels when they are secured to the purlins.

In one embodiment that is illustrated by FIG. 5, the edges 70a, 70b of the reflective insulation system 10 are secured to purlins 72a, 72b. The edges 70a, 70b of the reflective insulation system 10 may be secured to the purlins 72a, 72b by being sandwiched between a roof panel 74 and the purlins 72a, 72b, or they may be secured to the purlins 72a, 72b by double sided tape. The reflective insulation system 10 sags between the purlins 72a, 72b, creating a space between the reflective insulation system 10 and the roof panel 74.

When the roof panel 74 is warmer than the reflective layer 12, the roof panel 74 radiates heat to the layer of aluminum foil 12. The layer of aluminum foil reflects a large percentage of the radiated heat H back to the roof panel 74.

When an interior surface 76 of the building is warmer than the vapor barrier layer 16, the interior surface 76 radiates heat H to the vapor barrier layer 16. The vapor barrier layer 16 reflects at least a portion of the radiated heat back toward surfaces inside the building. The amount of heat radiated back toward surfaces inside the building varies depending on the type of vapor barrier layer 16 that is used. A vapor barrier layer 16 having an outer layer that is made from a reflective aluminum material reflects more of the radiated heat H (approximately 97%) back towards the interior of the building than a vapor barrier having an outer surface that is white polypropylene (approximately 85%).

FIG. 6 illustrates an alternate embodiment of a reflective insulation system 10'. FIG. 7 illustrates an apparatus for making the reflective insulation system 10' shown in FIG. 6. The reflective insulation system 10' is similar to the reflective insulation system 10 illustrated in FIG. 1A. For purposes of explanation, components of the insulation system 10' that are identical to the components shown in FIG. 1A will be designated by the same reference character.

Like the insulation system 10 shown in FIG. 1A, the insulation system 10' in FIG. 6 includes a layer of fiberglass 14 and a vapor barrier layer 16. The alternate construction also includes a reflective layer 12'. However, in the alternate embodiment, the reflective layer 12' has a transverse dimension that is narrower than the transverse dimension of the vapor barrier layer 16. As a result of this construction, respective edges 100a, 102a of edge portions of the reflective layer 12' and vapor barrier 16, are not aligned. As seen in FIG. 6, the reflective layer edge 100a is preferably spaced inwardly with respect to the vapor barrier edge 102b. This results in a staggered relationship between the edges 100a and 102a of the reflective and vapor barrier layers 12', 16. Although adhesive may be used to bond the edges of the vapor barrier to the reflective layer 12', in this embodiment a strip of tape 106, is used to secure the edge portions 100, 102 of reflective layer 12' and vapor barrier layer 16 together.

It has been found that by using a separate strip of tape to join the edges of the reflective layer 12' to the vapor barrier 16, the product is improved because the "tabs" are stiffened which promotes sealing of the overlapping tabs of adjacent lengths of the reflective insulation system 10'. A "tab" is indicated generally by the reference character 108 in FIG. 6. In addition to improving the sealing between overlapping tabs, the appearance of the installation is also improved.

FIG. 7 illustrates an apparatus for producing the reflective insulation system shown in FIG. 6. The apparatus shown in FIG. 7 is substantially similar to the apparatus shown in FIG. 2. For purposes of explanation, components that have the same function as the components in the apparatus show in FIG. 1A are designated by the same reference characters. The apparatus in FIG. 7 differs from the apparatus shown in FIG. 1A by the inclusion of a tape dispenser 110 which delivers a strip of tape 106 to the compression roll 52a. The tape is applied to the reflective and vapor barrier edge portions 100, 102. In the preferred embodiment, an outboard side 106a of the tape 106 is aligned with the edge 102a of the vapor barrier 16 and overlies the edge 100a of the reflective layer 12' as seen in FIG. 6.

It should be noted here that FIG. 6 illustrates one side of the insulation system 10'. The opposite side of the system 10' is constructed in the same fashion, i.e., the edge of the reflective layer is spaced inwardly from the edge of the vapor barrier and a strip of tape secures the edges together in the same way shown in FIG. 6.

The construction shown in FIG. 6 is a preferred construction. It should be understood, however, that the system could be constructed with the vapor barrier layer 16 having a narrower transverse dimension so that the edge 102a is spaced inwardly from the edge 100a of the reflective layer 12'. With this construction, the position of the tape 106 would be reversed in order to seal the inwardly spaced edge 102 to the edge 100 of the reflective layer.

An example of an insulation system constructed in accordance with this embodiment of the invention is as follows. The insulation system may include a vapor barrier sheet 16 having a transverse dimension of 78 inches and a reflective layer 12' having a transverse dimension of 75 inches. The insulation 14 sandwiched between the layers 16, 12' may have a dimension of 72 inches. With this exampled construction, the edges 100a of the reflective layer 12' would be spaced inwardly by approximately 1½ inches with respect to the edges 102a of the vapor barrier 16. A 2 inch wide strip of tape would then be used to seal and/or secure the edge portions 100, 102 together. With this configuration, approximately 0.5 inches (or 25% of the tape width) would overlie the edge portion 100 of the reflective layer. This configuration of the reflective insulation system provides satisfactory results. Depending on the width of the tape, the portion of the tape which overlies the reflective layer edge portion 100 can be increased or decreased.

According to the preferred embodiment, the tape 106 is preferably a continuous strip of a reflective foil tape so that the reflective properties of the insulation are not substantially affected by the tape. However, other types of tape including plastic and cloth tape are also contemplated by this invention.

As indicated above, in the preferred embodiment adhesive is also used to join the edges of the reflective end vapor barrier layers. However, adhesive in the edge region of the system can be reduced or eliminated if desired, by relying solely on the tape 106 to join the edges together.

Although the present invention has been described with a degree of particularity, it is the intent that the invention include all modifications and alterations falling within the spirit and scope of the appended claims.

The invention claimed is:

1. A reflective insulation system, comprising:
   a) an outermost aluminum layer that reflects approximately 97% of heat radiated to the aluminum layer;
   b) a layer of fiberglass having a first side bonded to said outermost aluminum layer by a first deposit of hot melt glue that is in direct contact with the layer of fiberglass and in direct contact with the outermost aluminum layer; and
   c) a layer of vapor retarder material bonded to a second side of said layer of fiberglass by a second deposit of hot melt glue that is in direct contact with the layer of fiberglass and in direct contact with the vapor retarder material and which is applied to said vapor retarder in a swirling pattern, said vapor retarder material comprising polypropylene approximately 0.0015 inches thick.

2. The insulation system of claim 1 wherein said vapor retarder material is a laminate and also includes a layer of scrim material, and a layer of kraft material.

3. The insulation system of claim 1 wherein said vapor retarder material is a laminate and also includes a layer of scrim material, and a layer of kraft material.

4. The insulation system of claim 1 wherein said reflective layer is perforated.

5. The insulation system of claim 4 wherein perforations in the reflective layer allow air trapped between the reflective layer and the layer of vapor retarder material to escape from the reflective insulation as the reflective insulation is rolled onto a reflective insulation roll.

6. A reflective insulation system, comprising:
   a) an outermost aluminum layer that reflects approximately 97% of heat radiated to the aluminum layer;
   b) a layer of fiberglass having a first side bonded to said outermost aluminum layer by a first deposit of hot melt glue that is in direct contact with the layer of fiberglass and in direct contact with the outermost aluminum layer; and
   c) a vapor retarder material bonded to a second side of said layer of fiberglass by a second deposit of hot melt glue that is in direct contact with the layer of fiberglass and in direct contact with the vapor retarder material, said vapor retarder material being a laminate including a layer of polypropylene, a layer of scrim material, and a layer of kraft material.

7. The insulation system of claim 6 wherein said reflective layer is perforated.

8. The insulation system of claim 7 wherein perforations in the reflective layer allow air trapped between the reflective layer and the layer of vapor retarder material to escape from the reflective insulation as the reflective insulation is rolled onto a reflective insulation roll.

9. A reflective insulation system, comprising:
   a) an outermost aluminum layer that reflects approximately 97% of heat radiated to the aluminum layer;
   b) a layer of fiberglass having a first side bonded to said outermost aluminum layer by a first deposit of hot melt glue that is in direct contact with the layer of fiberglass and in direct contact with the outermost aluminum layer; and
   c) a layer of vapor retarder material bonded to a second side of said layer of fiberglass by a second deposit of hot melt glue that is in direct contact with the layer of fiberglass and in direct contact with the vapor retarder material, and which is applied to said vapor retarder in a swirling pattern, said vapor retarder material comprising aluminum.

10. The reflective insulation system of claim 9 wherein said tape is an adhesive backed foil tape.

11. The insulation system of claim 9 wherein said reflective layer is perforated.

12. The insulation system of claim 11 wherein perforations in the reflective layer allow air trapped between the reflective layer and the layer of vapor retarder material to escape from the reflective insulation as the reflective insulation is rolled onto a reflective insulation roll.

13. A reflective insulation system, comprising:
   a) a reflective layer, said reflective layer comprising aluminum;
   b) a layer of fiberglass having a first side bonded to said reflective layer by a first deposit of hot melt glue;
   c) a layer of vapor retarder material bonded to a second side of said layer of fiberglass by a second deposit of hot melt glue;
   d) said reflective layer having a transverse dimension smaller than a transverse dimension of said vapor retarder material such that an edge portion of said reflective layer is spaced inwardly with respect to an edge portion of said vapor retarder material; and
   e) a strip of tape overlying and securing said edge portions of said reflective layer and said vapor retarder material.

14. The reflective insulation system of claim 13 wherein at least 25 percent of a transverse dimension of said tape overlies an edge portion of said reflective layer.

15. The insulation system of claim 13 wherein said vapor retarder material is a laminate and also includes a layer of scrim material, and a layer of kraft material.

16. The insulation system of claim 13 wherein said reflective layer is perforated.

17. The insulation system of claim 16 wherein perforations in the reflective layer allow air trapped between the reflective layer and the layer of vapor retarder material to escape from the reflective insulation as the reflective insulation is rolled onto a reflective insulation roll.

18. A reflective insulation system, comprising:
   a) an outermost aluminum layer that reflects approximately 97% of heat radiated to the aluminum layer;
   b) a layer of fiberglass having a first side bonded to said outermost aluminum layer by a first deposit of hot melt glue that is in direct contact with the layer of fiberglass and in direct contact with the outermost aluminum layer;

c) a vapor retarder material bonded to a second side of said layer of fiberglass by a second deposit of hot melt glue that is in direct contact with the layer of fiberglass and in direct contact with the vapor retarder material, said vapor retarder material being a laminate including a layer of polypropylene, a layer of scrim material, and a layer of kraft material;

d) said vapor retarder material having a transverse dimension larger than a transverse dimension of said aluminum layer such that edge portions of said aluminum layer are spaced inwardly with respect to edge portions of said vapor retarder material;

e) a strip of tape overlying and securing said edge portions of said aluminum layer to respective edge portion of said vapor retarder material, an outer edge of said tape being aligned with an outer edge of said vapor retarder material and an inside portion of said strip of tape overlying an edge portion of said aluminum layer.

19. The reflective insulation system of claim 18 wherein at least a 0.25 portion of said tape overlies said edge portion of said aluminum layer.

* * * * *